(12) United States Patent
Mack et al.

(10) Patent No.: US 11,053,752 B2
(45) Date of Patent: Jul. 6, 2021

(54) COILED TUBING POWER CABLE WITH VARYING INNER DIAMETER

(71) Applicant: BAKER HUGHES, A GE COMPANY, LLC, Houston, TX (US)

(72) Inventors: John Mack, Catoosa, OK (US); Kenneth O'Grady, Collinsville, OK (US); James Christopher Clingman, Broken Arrow, OK (US); Sean A. Cain, Tulsa, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 272 days.

(21) Appl. No.: 16/232,678

(22) Filed: Dec. 26, 2018

(65) Prior Publication Data
US 2019/0234155 A1    Aug. 1, 2019

Related U.S. Application Data

(60) Provisional application No. 62/623,030, filed on Jan. 29, 2018.

(51) Int. Cl.
| | | |
|---|---|---|
| *E21B 17/20* | (2006.01) | |
| *E21B 17/00* | (2006.01) | |
| *H01B 9/02* | (2006.01) | |
| *E21B 43/12* | (2006.01) | |
| *H02G 11/00* | (2006.01) | |

(52) U.S. Cl.
CPC .......... *E21B 17/206* (2013.01); *E21B 17/003* (2013.01); *H01B 9/023* (2013.01); *E21B 43/128* (2013.01); *H02G 11/006* (2013.01)

(58) Field of Classification Search
CPC .... E21B 17/003; E21B 17/206; E21B 43/128; H01B 9/023; H01G 11/006; H02G 11/006
See application file for complete search history.

(56) References Cited

U.S. PATENT DOCUMENTS

| | | | |
|---|---|---|---|
| 3,373,816 A | 3/1968 | Cochran | |
| 4,024,913 A | 5/1977 | Grable | |

(Continued)

FOREIGN PATENT DOCUMENTS

| | | |
|---|---|---|
| CN | 203188974 u | 9/2013 |
| CN | 203536192 U | 5/2014 |

OTHER PUBLICATIONS

International Search Report and Written Opinion of PCT Application PCT/US20109/012133 dated Apr. 26, 2019: pp. 1-9.

*Primary Examiner* — Christopher J Sebesta
(74) *Attorney, Agent, or Firm* — Bracewell LLP; Keith Derrington

(57) ABSTRACT

A string of coiled tubing having a power cable therein supports and supplies power to an electrical submersible well pump assembly in a well. The coiled tubing has an upper section and a lower section joining each other, the upper section having a smaller inner diameter than the lower section. The power cable has an upper portion installed in the upper section of the coiled tubing and a lower portion installed in the lower section of the coiled tubing. The power cable has three insulated electrical conductors embedded within an elastomeric jacket. A metal armor strip has turns wrapped helically around the jacket. The armor strip is compressed between the jacket and the coiled tubing both in the upper section and in the lower section of the coiled tubing.

19 Claims, 4 Drawing Sheets

(56) References Cited

U.S. PATENT DOCUMENTS

| | | | |
|---|---|---|---|
| 4,523,644 A | | 6/1985 | Dismukes |
| 4,629,218 A | * | 12/1986 | Dubois .................. E21B 17/20 |
| | | | 138/155 |
| 5,361,846 A | | 11/1994 | Carlin et al. |
| 5,590,515 A | | 1/1997 | Boden |
| 6,015,015 A | | 1/2000 | Luft et al. |
| 6,062,265 A | * | 5/2000 | Head ..................... E21B 17/206 |
| | | | 138/111 |
| 6,367,557 B1 | | 4/2002 | Rosine et al. |
| 6,479,752 B1 | * | 11/2002 | Neuroth .............. E21B 17/1028 |
| | | | 174/106 R |
| 6,527,056 B2 | | 3/2003 | Newman |
| 7,140,442 B2 | | 11/2006 | Mackay et al. |
| 9,163,296 B2 | | 10/2015 | Valdez et al. |
| 9,528,327 B1 | | 12/2016 | Lux |
| 9,725,997 B2 | | 8/2017 | Pinkston et al. |
| 2010/0326694 A1 | * | 12/2010 | Pesek ..................... H01B 7/046 |
| | | | 174/102 R |
| 2016/0047210 A1 | * | 2/2016 | Pinkston ............... E21B 43/128 |
| | | | 166/66.4 |

\* cited by examiner

COILED TUBING POWER CABLE WITH VARYING INNER DIAMETER

CROSS REFERENCE TO RELATED APPLICATION

This application claims priority to provisional application Ser. No. 62/623,030, filed Jan. 29, 2018.

FIELD OF THE DISCLOSURE

This disclosure relates in general to electrical submersible pumps for wells and in particular to an armored power cable installed within coiled tubing, the coiled tubing having an upper section with a smaller inner diameter than a lower section.

BACKGROUND

Electrical submersible pumps (ESP) are often used to pump fluids from hydrocarbon wells. An ESP includes a motor, a pump, and a seal section that reduces a pressure differential between well fluid on the exterior and dielectric lubricant in the motor interior. An ESP may have other components, such as a gas separator or additional pumps, seal sections and motors in tandem.

A power cable extends from the surface to the motor for supplying three-phase power. Usually the power cable has three conductors, each of which is separately insulated. A single elastomeric jacket is extruded over the three insulated conductors. A metal strip or armor wraps around the jacket. In round cable, the exterior of the jacket is cylindrical in cross-section. In most cases, a string of production tubing supports the ESP, and bands secure the power cable to and alongside the production tubing. When the ESP has to be retrieved for repair or replacement, a workover rig is required to pull the tubing along with the power cable and ESP.

It is desirable to avoid having to employ a workover rig to retrieve the ESP. However, a conventional power cable cannot support its own weight in many wells, thus needs additional support if production tubing is not utilized. One technique involves placing the power cable within coiled tubing, which is a continuous length of metal tubing deployed from a reel. The pump discharges up an annular space surrounding the coiled tubing.

Various methods have been proposed and employed to transfer the weight of the power cable to the coiled tubing. In one method, the power cable with armor is pulled through the coiled tubing after the coiled tubing has been formed. Various standoffs may be used or dimples may be formed in the coiled tubing engage the armor to anchor the power cable within the coiled tubing. In another method, the power cable without an armor is placed in the coiled tubing as the coiled tubing is being formed and seam welded.

Although the coiled tubing adds strength to the power cable, it also has its limits. A coiled tubing power cable may not be able to support its own weight in deeper wells.

SUMMARY

An apparatus for supporting and supplying power to an electrical submersible well pump includes a string of coiled tubing having an upper section and a lower section, the upper section having an outer diameter that is the same as an outer diameter of the lower section. The upper section has a greater wall thickness than the lower section. A power cable is installed within the string of coiled tubing. The power cable has an exterior portion in frictional engagement with an inner diameter of the upper section and with the lower section.

The exterior portion of the power cable may comprise an armor strip wrapped helically around the power cable. The armor strip is compressed between an interior portion of the power cable and the upper and lower sections of the string of coiled tubing.

The upper section and lower section of the string of coiled tubing join each other at a coiled tubing junction. The power cable has an upper portion and a lower portion with a power cable junction below the coiled tubing junction, defining a transition area from the coiled tubing junction to the power cable tubing junction. The armor strip is compressed in the upper and lower sections of the coiled tubing string to a greater extent than any compression in the transition area.

The portion of the power cable within the upper section of the string of coiled tubing has a same weight per linear increment as the portion of the power cable within the lower section of the string of coiled tubing.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figure 1:
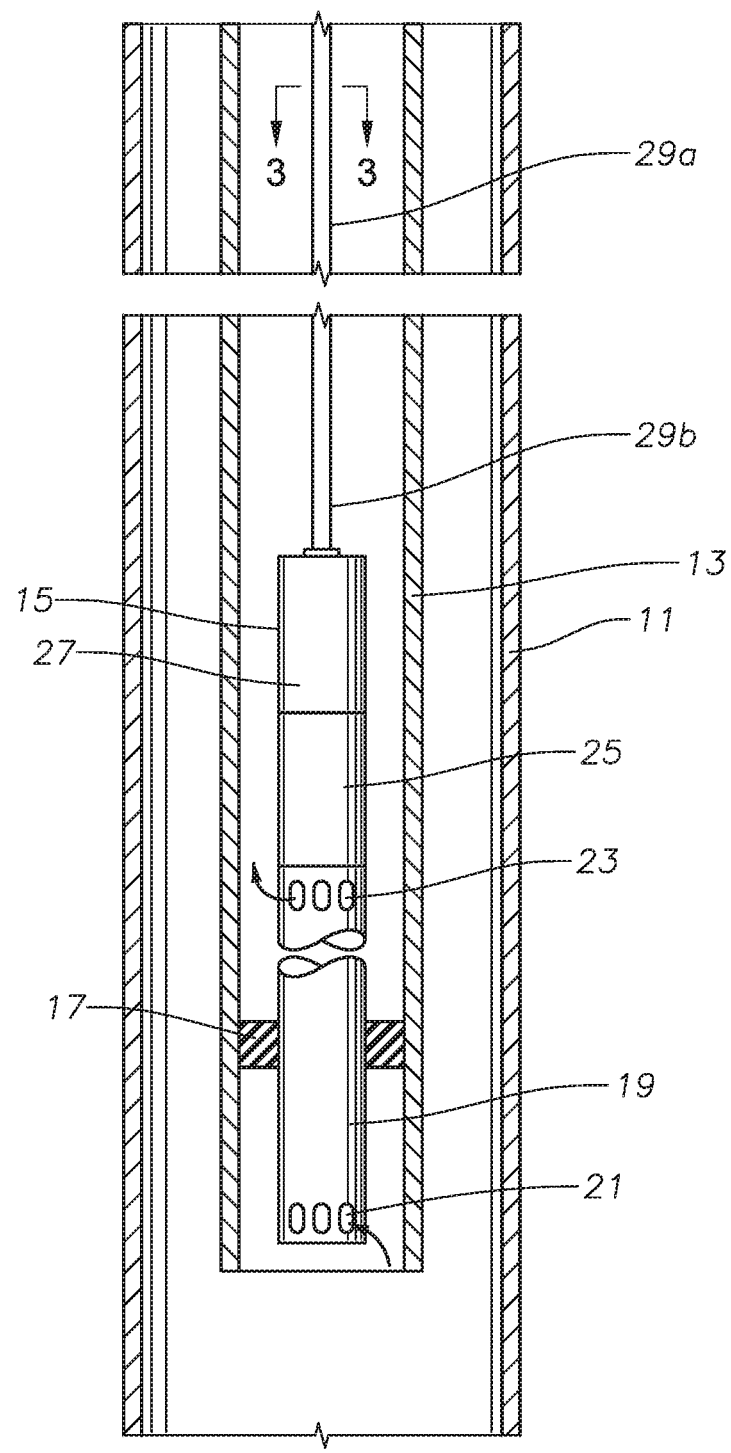
FIG. 1 is a schematic view of an electrical submersible pump assembly supported by a coiled tubing power cable in accordance with this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, the well includes casing 11, which will be cemented in place. In the embodiment shown, a tubular liner 13 extends through the casing 11. Liner 13, which serves as production tubing, is of a conventional type, having sections secured together by threads. Liner 13 is not cemented in the well. An electrical pump assembly (ESP) 15 is supported inside liner 13. A packer 17 supports ESP 15 in liner 13 and seals the annulus around ESP 15. Typically, ESP 15 has a stinger (not shown) on its lower end that slides into a polished bore in packer 17.

ESP 15 includes a centrifugal pump 19 of conventional design. Alternately, pump 19 could be another type of pump, such as a progressing cavity pump or a linear reciprocating pump. In this example, pump 19 has a lower end located below packer 17. Pump 19 has intake ports 21 below packer 17 and discharge ports 23 above packer 17 for discharging well fluid pumped from the well. Packer 17 seals the annulus between ESP 15 and liner 13, and pump 19 draws well fluid from below packer 17 and discharges it into the annulus above packer 17.

An electrical motor 27, normally a three phase type, is coupled to a seal section 25, which in turn connects to pump 19. Seal section 25 has components to reduce a pressure differential between lubricant contained in motor 27 and the well fluid. A shaft (not shown) extends from motor through seal section 25 and into pump 19 to rotate pump 19. The upper end of motor 27 has an adapter (not shown), which may be of various types, and serves as means for securing ESP 15 to a lower end of a length of coiled tubing 29. Although motor 27 is shown mounted above seal section 25 and pump 19, the assembly could be inverted with motor 27 at the lower end.

Figure 2:
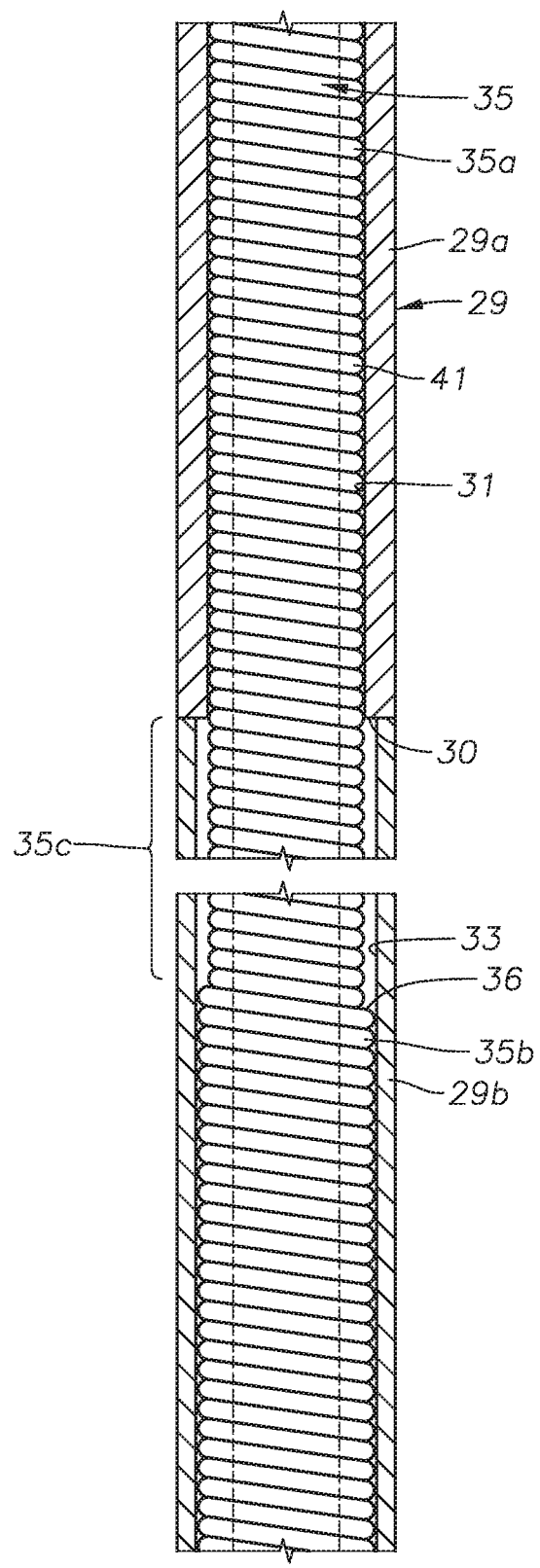
FIG. 2 is a longitudinal cross sectional view of part of the coiled tubing power cable of FIG. 1.

Referring to FIG. 2, coiled tubing 29 contains a power cable 35 for motor 27 and also supports the weight of power cable 35 and ESP 15 (FIG. 1) while ESP 15 is being lowered into the well. Coiled tubing 29 is metal, flexible tubing of a type that will be coiled on a reel (not shown) located at the surface while ESP 15 is deployed.

Coiled tubing 29 has an upper section 29a and a lower section 29b. It could also have one or more even lower sections (not shown) below lower section 29b. The lower end of upper section 29a is secured to the upper end of lower section 29b, such as by welding, forming a junction 30. Upper section 29a has an inner diameter 31 that is constant and smaller than an inner diameter 33 of lower section 29b. The outer diameters of upper section 29a and lower section 29b are constant and the same as each other. The smaller inner diameter 31 than inner diameter 33 results in upper section 29a having a greater wall thickness and strength than lower section 29b. The weight per linear increment, such as per foot, of upper section 29a will be greater than the weight per linear increment of lower section 29b. The difference between inner diameter 31 and inner diameter 33 is exaggerated in FIG. 2 and could be in the range from 0.015 to 0.020 inch.

Upper and lower sections 29a, 29b contain a power cable 35 for supplying electrical power to motor 27 (FIG. 1). Power cable 35 has an upper portion 35a located within coiled tubing upper section 29a. Power cable 35 has a lower portion 35b located within coiled tubing lower section 29b. Power cable upper portion 35a has an outer diameter in frictional contact with coiled tubing upper section inner diameter 31 so as to transfer part of the weight of power cable 35 to coiled tubing upper section 29a. Power cable lower portion 35b has a greater outer diameter than power cable upper portion 35a, and it is in frictional contact with coiled tubing lower section inner diameter 33 so as to transfer part of the weight of power cable 35 to coiled tubing lower section 29b.

In this example, a junction 36 between power cable upper portion 35a and power cable lower portion 35b does not precisely coincide with junction 30 between coiled tubing upper section 29a and lower section 29b. The junctions 30, 36 could be made to coincide, but to facilitate manufacturing, the length of power cable upper portion 35a is longer than the length of coiled tubing upper section 29a. Junction 36 between power cable upper portion 35a and power cable lower portion 35b is thus lower than junction 30 between coiled tubing upper section 29a and lower section 29b. The lower junction 36 results in a transition or intermediate portion 35c of power cable 35 that is not compressed by coiled tubing lower portion 29b to the same extent as the compression of lower power cable portion 35b by lower coiled tubing section 29b. It is feasible for there to be no compression of transition power cable portion 35c by lower coiled tubing section 29b. The example of FIG. 2 illustrates power cable transition section 35c to have a smaller outer diameter than lower coiled tubing section 29b. The length of transition portion 35c may be less than 100 feet, which is not very long compared to the lengths of power cable portions 35a and 35c, which may be thousands of feet in length.

As will be explained subsequently, initially, power cable upper portion 35a will have an outer diameter slightly larger than coiled tubing upper section inner diameter 31, and after manufacturing has been completed, it will be under some radial compression. Similarly, power cable lower portion 35b will have an initial outer diameter slightly larger than coiled tubing lower section inner diameter 33, and after manufacturing has been completed, it will be under some radial compression. The amount of interference or radial compression of power cable upper portion 35a and power cable lower portion 35b could be the same, or it could differ.

Power cable 35 is continuous from its upper end to its lower end. Power cable portions 35a, 35b are not joined by a splice in this embodiment. Although lower power cable portion 35b has a greater outer diameter than upper power cable portion 35a in this embodiment, it has the same weight per linear increment as upper power cable portion 35a. The lengths of coiled tubing upper section 29a and coiled tubing lower section 29b can vary and typically would not be the same. If they were the same in length, coiled tubing upper section 29a and power cable upper portion 35a would weigh more than coiled tubing lower section 29b and power cable lower portion 35b.

The lesser weight of coiled tubing lower section 29b enables the total length of coiled tubing 29 to be longer than if it had only the wall dimensions of coiled tubing upper section 29a. For example, a string of coiled tubing having the same wall dimensions as coiled tubing upper section 29a and containing power cable 35 might not be able to have length greater than 8000 feet without risk of parting due to its own weight. A combined length of coiled tubing upper portion 29a and lower portion 29b containing power cable 35 might be 10,000 feet. The length and wall dimensions of coiled tubing upper portion 29a are sized to support not only its own weight, but also the weight of coiled tubing lower portion 29b and power cable 35.

Figure 3:
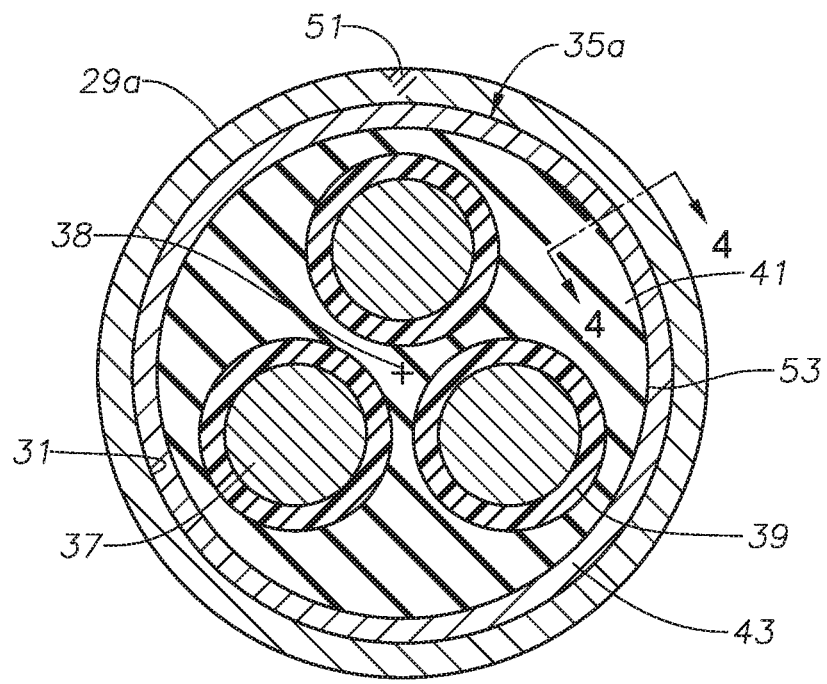
FIG. 3 is a transverse cross sectional view of the coiled tubing power cable of the pump assembly of FIG. 1, taken along the line 3-3 of FIG. 1.

Referring to FIG. 3, power cable 35 includes three electrical conductors 37 for delivering power to motor 27. Each conductor 37 is of electrically conductive material, such as copper. At least one electrical insulation layer 39 surrounds each conductor 37. Insulated conductors 37 are twisted about each other along a power cable center line 38. At any point, when viewed in a transverse cross-section perpendicular to power cable center line 38, insulated conductors 37 will appear oriented 120 degrees apart from each other. The twisting of insulated conductors 37 enables power cable 31 to be rolled onto a reel.

The interior of power cable 35 also includes an elastomeric jacket 41, which may be of a conventional material, extruded around all three of the insulated conductors 37. Jacket 41 may be either electrically conductive or electrically non-conductive, and it optionally may have longitudinally extending grooves or ridges (not shown) on its cylindrical exterior. Insulation layer 39 and jacket 41 may be of a variety of conventional polymeric insulation materials. Suitable materials include the following: EPDM (ethylene propylene dienne monomer), NBR (nitrile rubber), HNB Hydrogenated Nitrile rubber, FEPM aflas rubber, FKM rubber, polypropylene (PP), polyethylene (PE), cross-linked PE or PP, thermoplastic elastomers, fluoropolymers, thermoplastics or thermoset elastomers.

In this embodiment, the outer diameter of jacket 41 is the same throughout power cable 35. As illustrated in FIG. 2, the outer diameter of jacket 41 in power cable upper portion 35a is the same as in power cable lower portion 35b. The portion of jacket 41 and conductors 37 in power cable upper portion 35a is contiguous with and the same as in power cable lower portion 35b.

Power cable 35 includes an exterior portion which is a metal band, tape or armor strip 43 wrapped helically around jacket 41. Armor strip 43 is preferably formed of a steel material, although Monel, aluminum, copper or other metals are feasible. The turns of armor strip 43 overlap and preferably interlock with each other. As shown also in FIG. 4, armor strip 43, may have a generally S-shaped or sinusoidal shaped configuration in cross section. Armor strip 43 has an inward facing curved valley or concave surface 43a that terminates in an inward facing edge 43b, relative to power cable center line 38 (FIG. 3). Armor strip 43 has an outward facing curved valley or convex surface 43c that terminates in an outward facing edge 43d. Inward and outward facing valleys 43a, 43c join each other in a curved central transition area. The edges 43b and 43d of one turn of armor strip 43 overlap with edges 43b, 43d of adjacent turns of armor strip 43. Edges 43b and 43d are at opposite margins of armor strip 43. Inward facing edge 43b extends into and may touch the outer surface of outward facing valley 43c of an adjacent turn. Outward facing edge 43d extends into and may touch the inner surface of inward facing valley 43a of the other adjacent turn. Armor strip 43 thus fully surrounds jacket 41.

During manufacturing, armor strip 43 is wrapped more tightly around jacket 41 while forming power cable upper portion 35a than while forming power cable lower portion 35b. The tighter wrap results in an initial smaller outer diameter for power cable upper portion 35a than for power cable lower portion 35b. The initial outer diameter of the portion of armor strip 43 on power cable upper portion 35a is slightly greater than the final inner diameter 31 of coiled tubing upper section 29a after completion of the installation of power cable 35 in coiled tubing 29. The initial outer diameter of the portion of armor strip on power cable lower portion 35b is slightly greater than final inner diameter 33 of coiled tubing lower section 29b after completion.

Armor strip 43 is radially deformed from an original transverse or radial dimension prior to installation of power cable 35 in coiled tubing 29 to a smaller radial dimension. An annular gap 49 exists between inner diameters 31, 33 of coiled tubing upper and lower portions 29a, 29b and the outer diameter of jacket 41. In this example, annular gap 49 is less in coiled tubing upper section 29a than in coiled tubing lower section 29b because of the smaller inner diameter 31 of coiled tubing upper section 29a. After power cable 35 is installed within coiled tubing 29, annular gap 49 has a radial thickness or dimension that is less than the initial radial dimension of armor strip 43 measured from the innermost point of outward facing valley 43c to the outermost point of inward facing valley 43a. The smaller dimension of annular gap 49 deforms armor strip 43 to the same radial dimension as gap 49, thereby placing armor strip 43 in tight frictional engagement with coiled tubing inner diameters 31 and 33. The deformation of armor strip 43 may be elastic or permanent. The friction created by armor strip 43 being deformed against inner diameters 31, 33 of coiled tubing sections 29a, 29b is adequate to transfer the weight of power cable 35 to coiled tubing 29.

Power cable 35 is pre-formed, then installed in coiled tubing 29 while coiled tubing 29 is being manufactured. Power cable 35 will be formed with armor strip 43 wrapped to a first tightness around and in frictional engagement with jacket 41 for power cable upper portion 35a and to a lesser tightness around jacket 41 for power cable lower portion 35b. When power cable 35 is installed during manufacturing, coiled tubing 29 is rolled from a flat strip into a cylindrical shape, and a longitudinal weld is made of the abutting edges, as shown by weld seam 51 in FIG. 3. The flat strip used in making up coiled tubing upper section 29a has a greater thickness than the flat strip used in making up coiled tubing lower section 29b. The lower end of the flat strip for coiled tubing upper section 29a will be welded to the upper end of the flat strip for coiled tubing lower section 29b.

Figure 5:
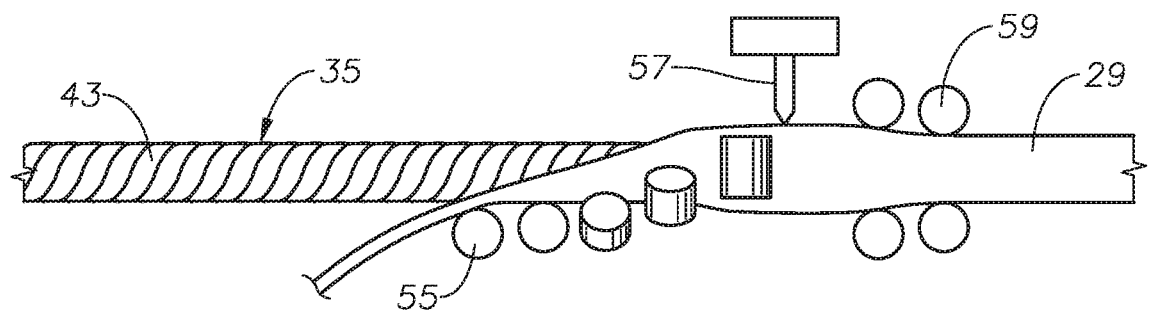
FIG. 5 is schematic view of the coiled tubing being formed and welded around the power cable of FIG. 2.

FIG. 5 schematically illustrates a manufacturing process of installing power cable 35 in coiled tubing 29 while the coiled tubing is being manufactured. Forming rollers 55 deform the flat metal strip into a cylindrical configuration around power cable 35 in a continuous process. Then a welding device, such as a laser torch 57, welds seam 51 (FIG. 3). Armor strip 43 avoids direct contact of laser 57 with the elastomeric jacket 41, which otherwise would create smoke. The smoke inhibits effective welding of weld seam 51. Armor strip 43 also reduces the amount of heat received by jacket 41 from laser torch 57. Upper power cable portion 35a and lower power cable portion 35b feed into coiled tubing sections 29a, 29b as they are being roll formed and seam welded.

Figure 4:
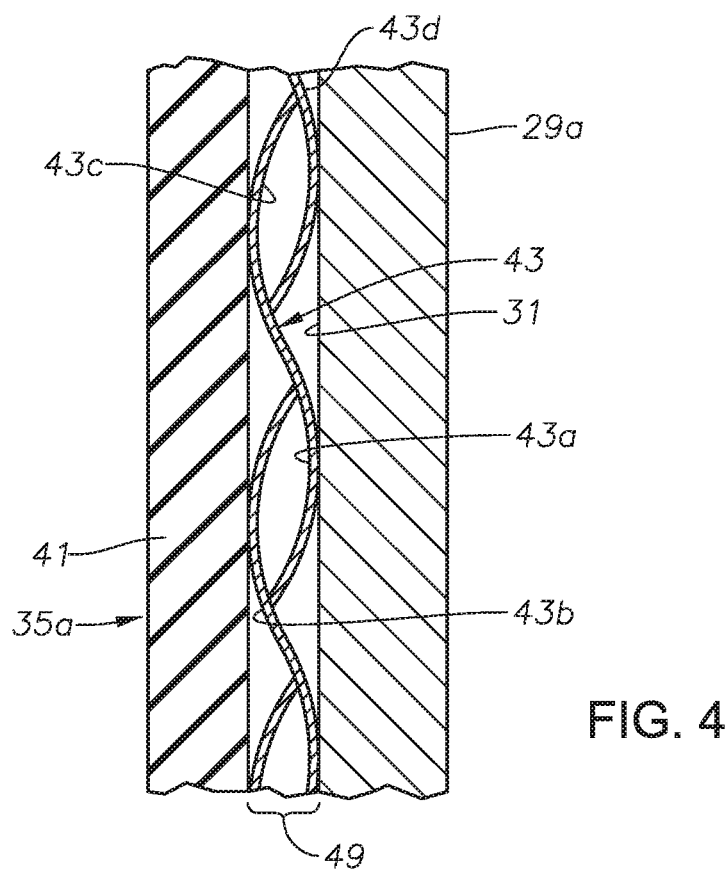
FIG. 4 is a longitudinal cross sectional view of a portion of the power cable coiled tubing of FIG. 3, taken along the line 4-4 of FIG. 3.

After welding, coiled tubing 29 undergoes a swaging process with swage rollers 59 to reduce the initial outer diameter of coiled tubing 29 to a final outer diameter. Referring to FIG. 4, before the swaging process, annular gap 49 will have a greater radial thickness than afterward. The radial dimension of armor strip 43 both in the upper coiled tubing section 29a and in the lower coiled tubing section 29b is likewise greater before the swaging process than afterward. Before the swaging process, armor strip 43 may be touching coiled tubing inner diameters 31, 33 or there could be a slight clearance, or even some radial compression. The swaging process causes the radial dimension of annular gap 49 (FIG. 5) to reduce in upper coiled tubing section 29a, lower coiled tubing section 29b and in the power cable transition area 35c. After swaging, armor strip 43 in power cable transition area 35c possibly will not be in compression from coiled tubing lower section 29b, or if it is, the compression will be less than in coiled tubing upper and lower sections 29a, 29b. The reduction in radial dimension by swaging more tightly compresses armor strip 43 to increase the frictional engagement of armor strip 43 with coiled tubing 29.

During the swaging process, inward facing edges 43b slide on outward facing valleys 43c. Outward facing edges 43d slide on inward facing valleys 43a. Valleys 43a and 43c reduce in radial dimension during the swaging process. The material of jacket 41 is preferably non compressible, although jacket 41 can be deformed. The outer diameter of jacket 41 thus may remain constant during the swaging process.

As an example, armor strip 43 may be formed of a material having a thickness in the range from 0.003 to 0.040 inch. While being radially deformed by the swaging process, the radial dimension of armor strip 43 and gap 49 may decrease by an amount in the range from about 0.005 to 0.025 inch. In this example, the swaging process thus decreases coiled tubing inner diameters 31, 33 by an amount from about 0.010 to 0.050 inch, but it could be more.

Coiled tubing 29 does not need to be annealed after the welding process, thus may be ready for use after the swaging process. During operation of ESP 15 (FIG. 1), the spaces between inward facing valleys 43a and the jacket outer diameter and the spaces between outward facing valleys 43c and coiled tubing inner diameters 31, 33 provide additional room for the material of jacket 41 to distort and flow to relieve forces resulting from thermal expansion.

While the disclosure has been shown in only a few of its forms, it should be apparent to those skilled in the art that it is not so limited, but is susceptible to various changes without departing from the scope of the claims.

The invention claimed is:

1. An apparatus for supporting and supplying power to an electrical submersible well pump, comprising:
    a string of coiled tubing having an upper section and a lower section, the upper section having an outer diameter that is the same as an outer diameter of the lower section;
    the upper section and the lower section each having cylindrical bores, the cylindrical bore of the upper section having a smaller inner diameter than the cylindrical bore of the lower section, resulting in a greater wall thickness of the upper section than the lower section;
    a power cable installed within the string of coiled tubing, the power cable having an exterior portion radially compressed against the cylindrical bore of the upper section and with the cylindrical bore of the lower section; wherein
    the upper section and the lower section of the string of coiled tubing join each other at a coiled tubing junction;
    the power cable has an upper portion and a lower portion with a power cable junction below the coiled tubing junction, defining a transition area from the coiled tubing junction to the power cable tubing junction;
    the exterior portion of the power cable in the lower portion of the power cable has an outer diameter that is greater than an outer diameter of the exterior portion of the power cable in the upper portion of the power cable; and
    the exterior portion of the power cable is radially compressed against the cylindrical bores of the upper and lower sections of the coiled tubing to a greater extent than any radial compression of the exterior portion of the power cable in the transition area.

2. The apparatus according to claim 1, wherein:
    the exterior portion of the power cable comprises an armor strip wrapped helically around the power cable, the armor strip being radially compressed against the cylindrical bores of the upper and lower sections of the string of coiled tubing.

3. The apparatus according to claim 1, wherein:
    the portion of the power cable within the upper section of the string of coiled tubing has a same weight per linear increment as the portion of the power cable within the lower section of the string of coiled tubing.

4. An apparatus for supporting an electrical submersible well pump assembly in a well, comprising:
    a string of coiled tubing having an upper section and a lower section joining each other, the upper section and the lower section each having a cylindrical bore, the cylindrical bore of the upper section having a smaller inner diameter than the cylindrical bore of the lower section;
    a power cable having an upper portion installed in the upper section of the coiled tubing and a lower portion installed in the lower section of the coiled tubing, the power cable comprising:
    three insulated electrical conductors embedded within an elastomeric jacket;
    a metal armor strip having turns wrapped helically around the jacket; and
    the armor strip having an inner side radially compressed around the jacket and an outer side radially compressed against the cylindrical bores of the upper and lower sections of the coiled tubing.

5. The apparatus according to claim 4, wherein the upper and lower sections of the coiled tubing have the same outer diameter.

6. An apparatus for supporting an electrical submersible well pump assembly in a well, comprising:
    a string of coiled tubing having an upper section and a lower section joining each other, the upper section having a smaller inner diameter than the lower section;
    a power cable having an upper portion installed in the upper section of the coiled tubing and a lower portion installed in the lower section of the coiled tubing, the power cable comprising:
    three insulated electrical conductors embedded within an elastomeric jacket;
    a metal armor strip having turns wrapped helically around the jacket;
    the armor strip being compressed between the jacket and the coiled tubing both in the upper section and in the lower section of the coiled tubing; and wherein:
    the armor strip of the upper portion of the power cable has a smaller outer diameter than the armor strip of the lower portion of the power cable.

7. The apparatus according to claim 4, wherein:
    the jacket in the upper portion of the power cable has a same outer diameter as the jacket in the lower portion of the power cable.

8. The apparatus according to claim 4, wherein:
    the armor strip in the upper portion of the power cable has a lesser radial thickness than a radial thickness of the armor strip in the lower portion of the power cable.

9. The apparatus according to claim 4, wherein:
    the upper portion of the power cable joins the lower portion of the power cable below a junction between the upper portion of the coiled tubing and the lower portion of the coiled tubing.

10. The apparatus according to claim 4, wherein:
a weight per linear increment of the upper section of the coiled tubing with the upper portion of the power cable installed therein is greater than a weight per linear increment of the lower section of the coiled tubing with the lower portion of the power cable installed therein.

11. The apparatus according to claim 4, wherein:
prior to installation in the coiled tubing, a weight per linear increment of the upper portion of the power cable is the same as a weight per linear increment of the lower portion of the power cable.

12. The apparatus according to claim 4, wherein a length of the upper section of the coiled tubing is greater than a length of the lower section of the coiled tubing.

13. The apparatus according to claim 4, wherein:
prior to installation in the coiled tubing, an outer diameter of the upper portion of the power cable is less than an outer diameter of the lower portion of the power cable.

14. An apparatus for supporting an electrical submersible well pump assembly in a well, comprising:
a string of coiled tubing having an upper section and a lower section joining each other, the upper section and the lower section each having a cylindrical bore, the cylindrical bore of the upper section having a smaller inner diameter than the cylindrical bore of the lower section, the upper and lower sections having outer diameters that are the same;
a power cable having an upper portion installed in the upper section of the coiled tubing and a lower portion installed in the lower section of the coiled tubing, the power cable comprising:
three insulated electrical conductors embedded within an elastomeric jacket, the jacket having an outer diameter in the upper portion of the power cable that is the same as in the lower portion of the power cable;
a metal armor strip having turns wrapped helically around the jacket; and
the armor strip having an outer side in radial compressive contact with the cylindrical bores of the upper section and the lower sections of the coiled tubing.

15. The apparatus according to claim 14, wherein:
prior to installation in the coiled tubing, the upper portion of the power cable has a same weight per linear increment as the lower portion of the power cable.

16. The apparatus according to claim 14, wherein:
the upper section of the coiled tubing with the upper portion of the power cable therein has a greater weight per linear increment than the lower section of the coiled tubing with the lower portion of the power cable therein.

17. The apparatus according to claim 14, wherein:
a length of the upper section of the coiled tubing with the upper portion of the power cable therein is greater than a length of the lower section of the coiled tubing with the lower portion of the power cable therein.

18. The apparatus according to claim 14, wherein:
prior to installation of the power cable in the coiled tubing, the armor strip in the upper portion of the power cable has a lesser outer diameter than the armor strip in the lower portion of the power cable.

19. The apparatus according to claim 14, wherein:
the armor strip is wrapped more tightly around the jacket in the upper portion of the power cable than the lower portion of the power cable.

\* \* \* \* \*